United States Patent [19]

Boyer

[11] Patent Number: 5,001,942
[45] Date of Patent: Mar. 26, 1991

[54] CABLE OPERATING APPARATUS INCLUDING A POCKETED PAWL

[75] Inventor: Billy G. Boyer, Fort Wayne, Ind.
[73] Assignee: Orscheln Co., Moberly, Mo.
[21] Appl. No.: 485,536
[22] Filed: Feb. 27, 1990
[51] Int. Cl.⁵ .............................................. G05G 5/06
[52] U.S. Cl. .................. 74/535; 74/501.5 R; 74/538
[58] Field of Search ................ 74/526, 535, 536, 533, 74/529, 501.5 R, 578, 577 M, 577 S, 575, 577 R; 192/111 A

[56] References Cited

U.S. PATENT DOCUMENTS

| | | | |
|---|---|---|---|
| 1,290,454 | 1/1919 | Willis et al. | 74/533 |
| 2,905,024 | 9/1959 | McCarthy et al. | 74/529 X |
| 3,621,959 | 11/1971 | Gale et al. | 192/111 A |
| 3,972,247 | 8/1976 | Armstrong | 74/535 X |
| 4,138,905 | 2/1979 | Konishi | 74/535 X |
| 4,181,209 | 1/1980 | Wheaton | 192/111 A |
| 4,267,748 | 5/1981 | Grunewald et al. | 74/529 |
| 4,442,923 | 4/1984 | Wakatsuki et al. | 192/111 A X |
| 4,512,210 | 4/1985 | Gurney | 74/535 |
| 4,519,270 | 5/1985 | Kawaguchi et al. | 74/535 |
| 4,612,823 | 9/1986 | De Leeuw et al. | 74/535 |
| 4,819,501 | 4/1989 | Kraus et al. | 74/535 X |
| 4,841,798 | 6/1989 | Porter et al. | 74/501.5 |
| 4,850,242 | 7/1989 | Hass et al. | 74/512 |

FOREIGN PATENT DOCUMENTS 58-218459  12/1983  Japan ................................. 74/529

Primary Examiner—Rodney M. Lindsey
Attorney, Agent, or Firm—Laubscher, Presta & Laubscher

[57] ABSTRACT

Cable operating apparatus includes an automatic cable slack removing arrangement, characterized in that the cable tension-adjusting pawl is mounted both for pivotal movement between engaged and disengaged positions relative to the tension-adjusting ratchet, and for lateral movement between nested and extended positions relative to a pocket defined within the operating handle to which the pawl is connected. A cable-tension pawl spring biases the pawl toward the engaged and extended positions, so that when the pawl is engaged with the cable-tension ratchet, the cable tension will bias the ratchet in a direction to displace the pawl to its nested position in frictional engagement with the bottom wall of the pocket, whereby the pawl is more positively maintained in the ratchet-engaged condition. The pawl includes a lateral tab that engages a ramp on the main ratchet when the handle is in the cable-released position, thereby to disengage the cable-tension pawl from its ratchet and thus activate the automatic cable slack removing device.

9 Claims, 5 Drawing Sheets

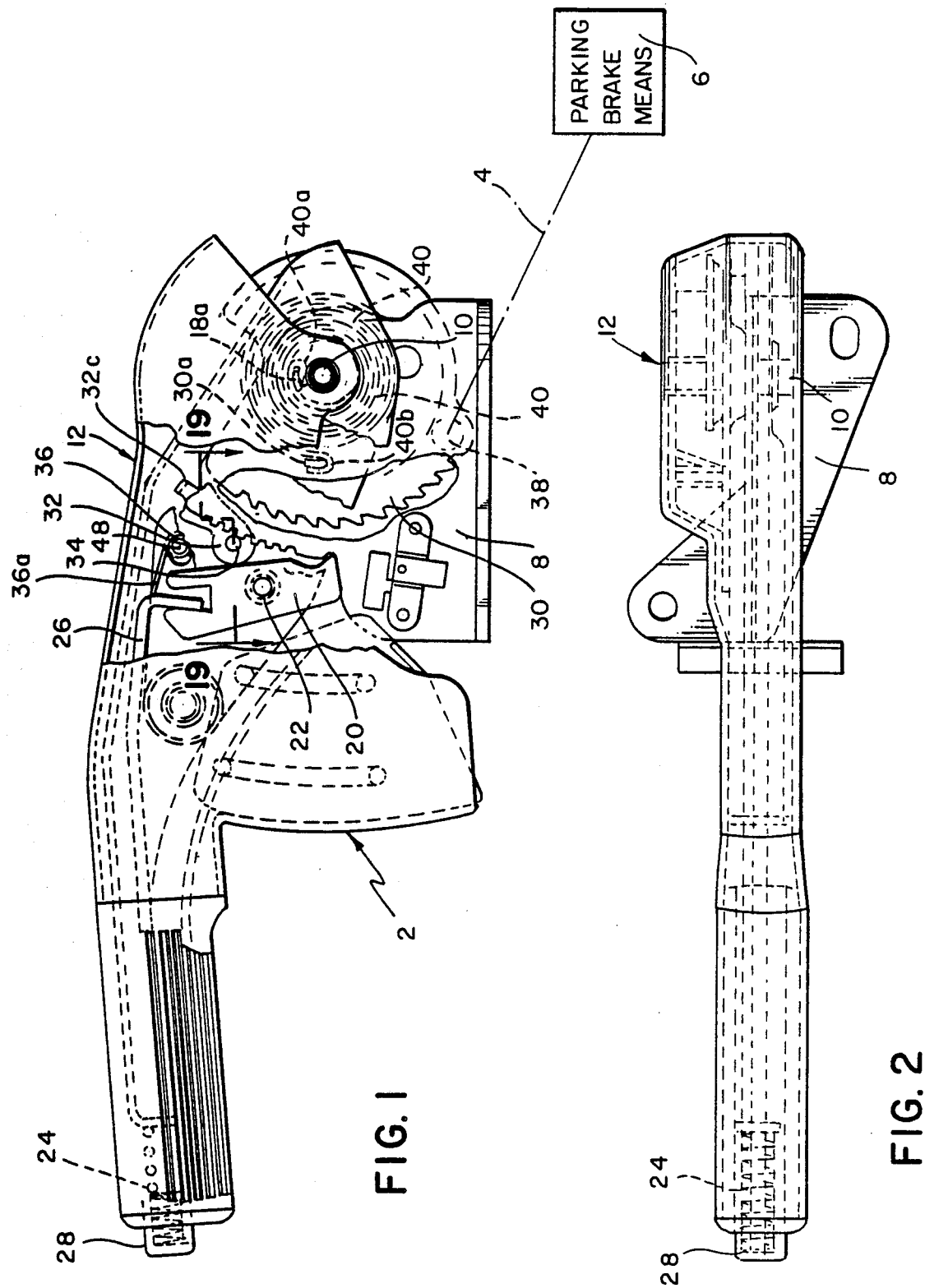

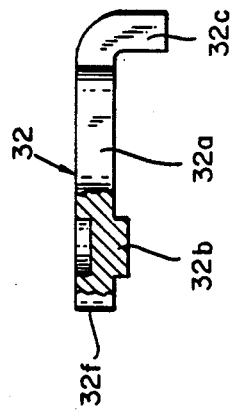
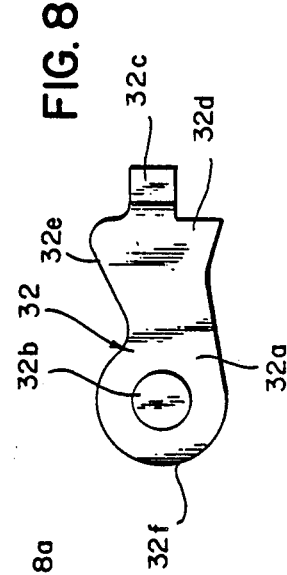
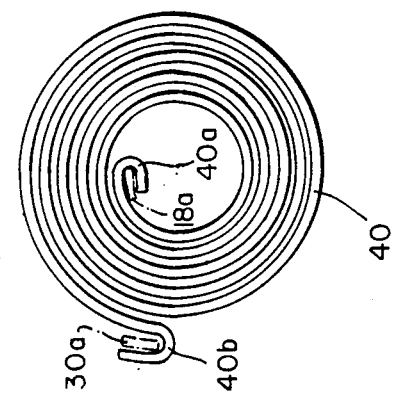
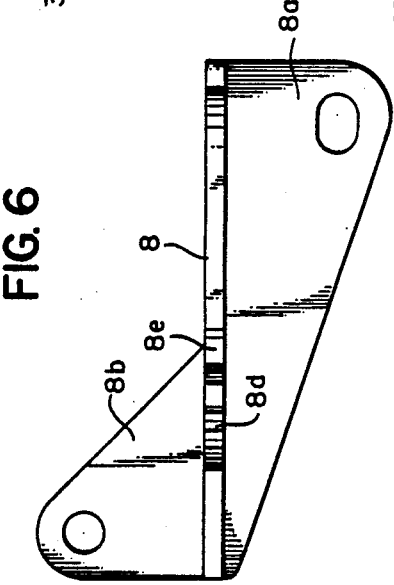
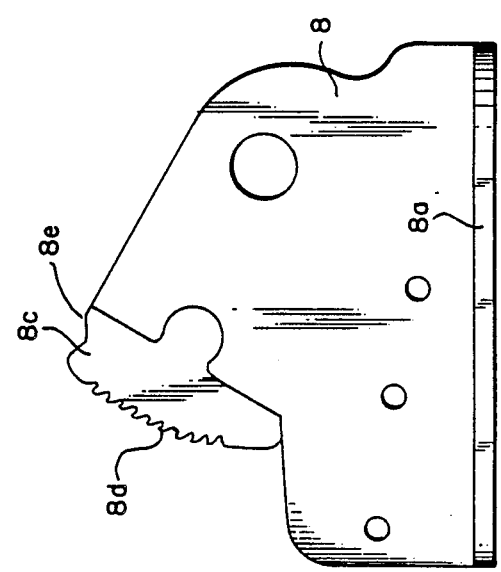
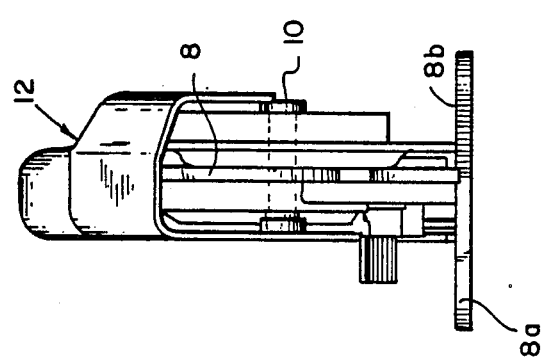

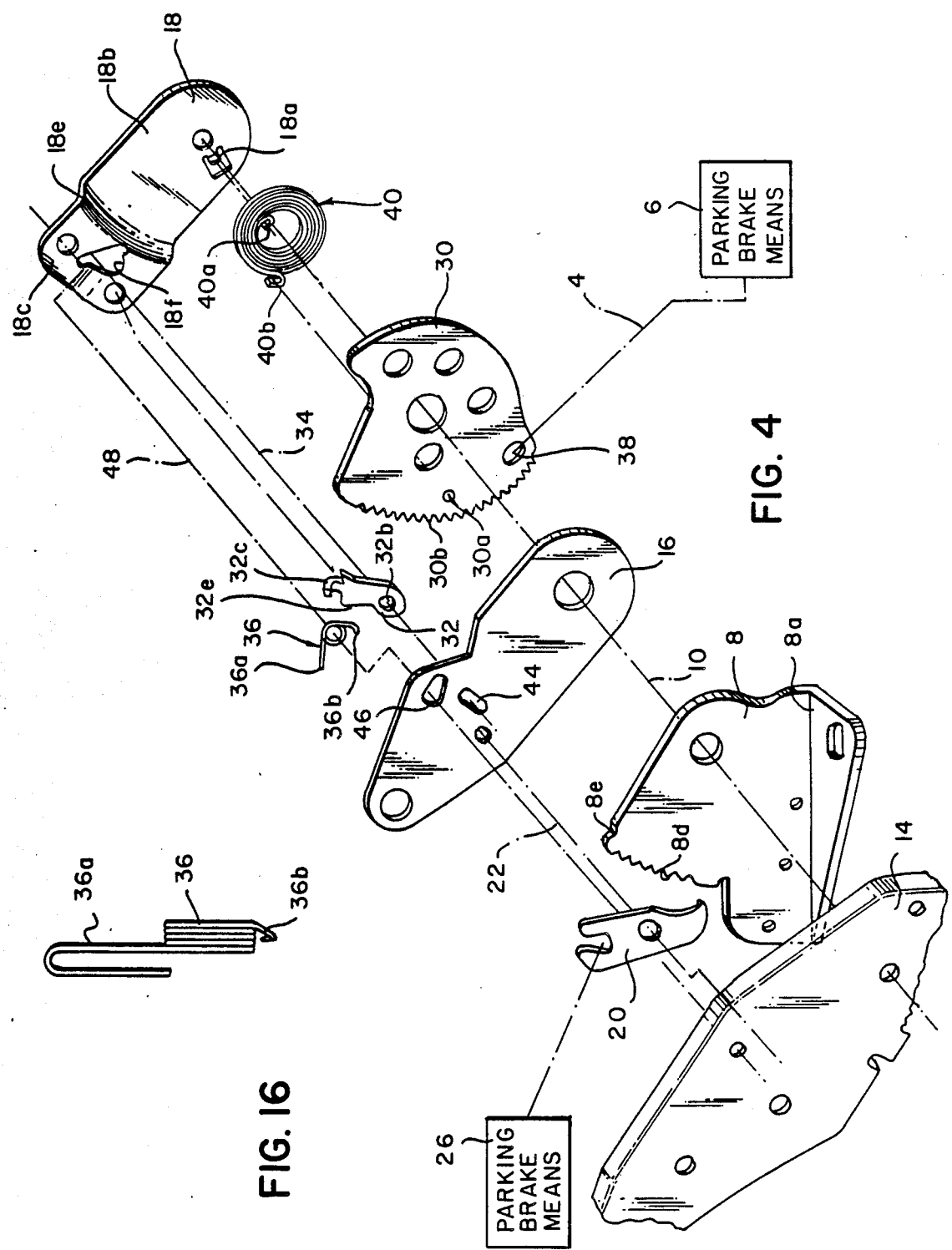

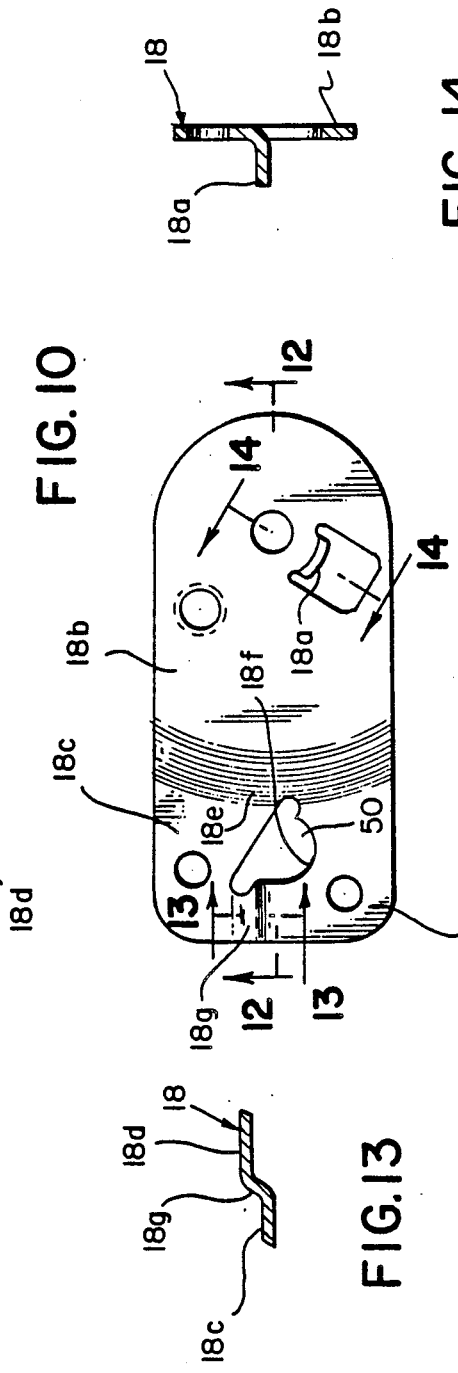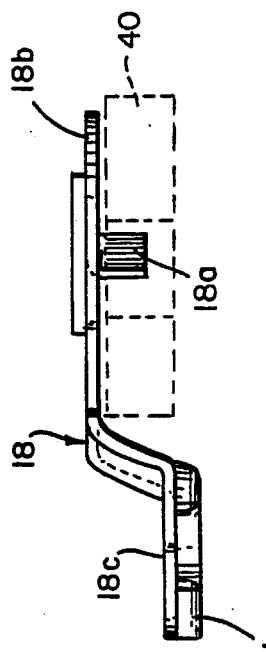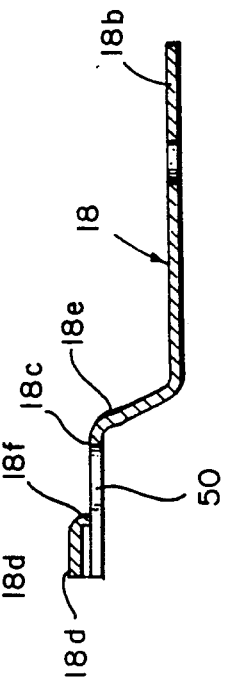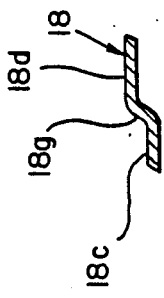

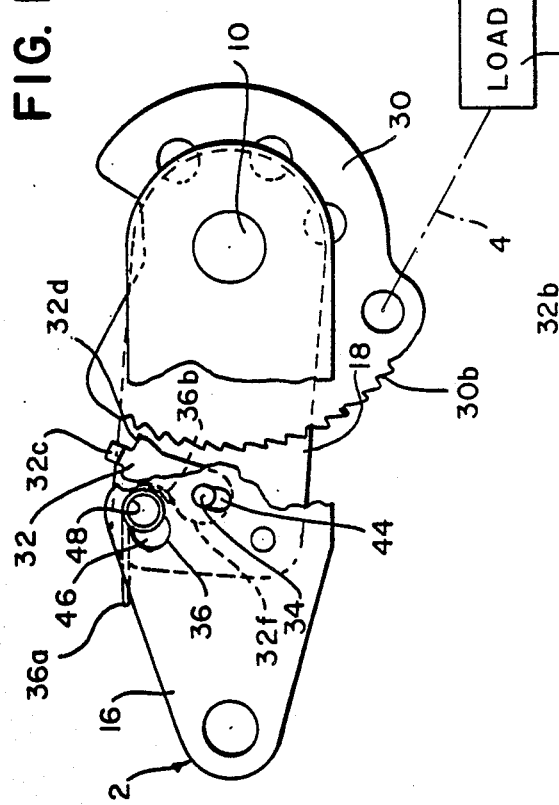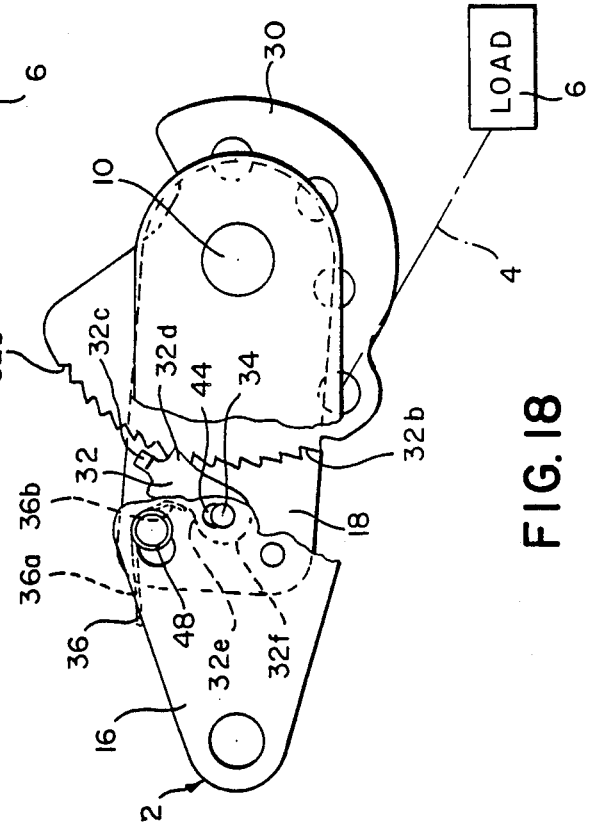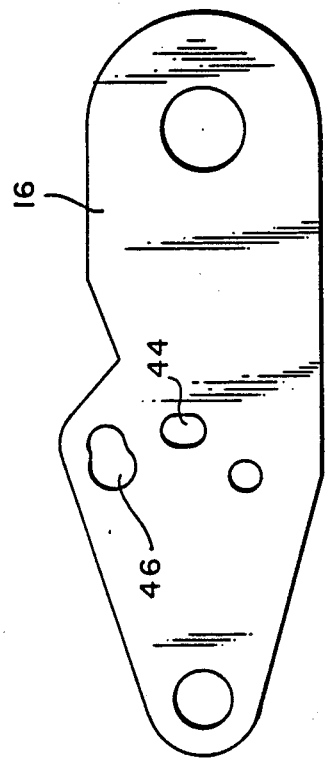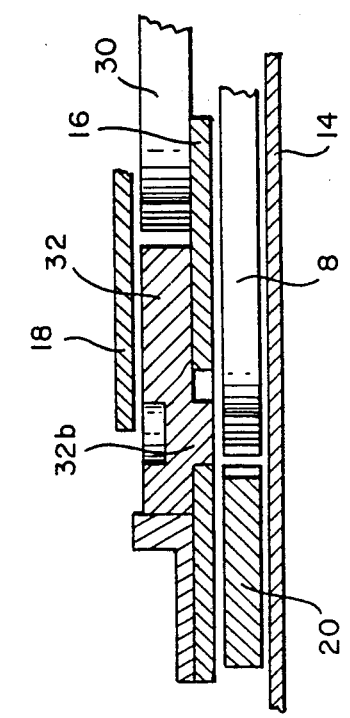

CABLE OPERATING APPARATUS INCLUDING A POCKETED PAWL

BRIEF DESCRIPTION OF THE PRIOR ART

It is well known in the patented prior art to provide cable operating systems—such as parking brake systems, for example—with automatic cable slack eliminating means that are activated when the operating handle or lever is returned to the cable-released position. Examples of such systems are disclosed in the patents to Porter et al. U.S. Pat. No. 4,841,798 and Hass et al. U.S. Pat. No. 4,850,242, and the pending application of Carlson et.al. Ser. No. 07/406,549 filed Sept. 13, 1989.

In these known arrangements, in addition to the main pawl and ratchet operating means, a cable-tensioning pawl is provided that is automatically released from an associated cable-tensioning ratchet when the operating handle or lever is returned to the brake-released position, thereby to effect automatic operation of the cable slack removing means. The cable-tensioning pawl is normally connected only for pivotal movement relative to the operating handle or lever means, whereby the load is transmitted from the ratchet through the pawl and to the lever via the pivot pin with only line contact between the pawl and the pivot pin. Therefore, as the load increases, it remains relatively easy for the pawl to become disengaged from the ratchet. Owing to this and to the fact that the pawl is allowed only pivotal movement, it is not uncommon for the pawl tooth to be only partially engaged with the ratchet teeth, in which case the pawl tooth may chip and/or slip out of engagement, causing failure of the mechanism.

The present invention was developed to avoid the above and other drawbacks of the known cable-operating systems including automatic cable slack removing means.

SUMMARY OF THE INVENTION

Accordingly, a primary object of the invention is to provide a cable tensioning system of the type including main pawl and ratchet means, and automatic cable slack removing means including a cable-tensioning pawl and ratchet system, characterized in that the cable-tensioning pawl is mounted on the operating handle means for pivotal movement between engaged and disengaged positions relative to its associated cable-tensioning ratchet, and for lateral movement between nested and extended positions relative to a pocket defined within said operating handle means, whereby when said pawl is in the nested position, the frictional cooperation between the bottom wall of the pocket and the cable-tensioning pawl serves to resist pivotal movement of the pawl and to more positively retain the pawl in engagement with the teeth of the cable-tensioning ratchet.

According to a more specific object of the invention, the operating handle means includes parallel spaced main handle, divider and cover plates, said main pawl and ratchet means being contained between said main handle and divider plates, and said cable-tensioning pawl and ratchet means being contained between said divider and cover plates. The cover plate is so deformed as to cooperate with the divider plate to define the pocket for receiving the associated end extremity of the cable-tensioning pawl. Preferably, the end extremity of the pawl is rounded to have a semi-circular configuration, and the bottom wall of the pocket has a corresponding semicircular surface defined by a flange formed by stamping a portion of the cover plate adjacent an opening contained therein.

BRIEF DESCRIPTION OF THE DRAWING

Other objects and advantages of the invention will become apparent from a study of the following specification, when viewed in the light of the accompanying drawing, in which:

FIG. 1 is a partly broken-away side elevational view of the cable operating apparatus;

FIGS. 2 and 3 are top plan and end views, respectively, of the apparatus of FIG. 1;

FIG. 4 is a detailed exploded view of the apparatus of FIGS. 1–3, with certain parts omitted for clarity;

FIGS. 5 and 6 are side elevational and top plan views of the main ratchet member of FIGS. 1 and 4;

FIG. 7 is an end view of the cable-slack removing tensioning spring of FIG. 4;

FIGS. 8 and 9 are side elevational and top plan views, respectively, of the cable-tensioning pawl;

FIGS. 10 and 11 are top plan and side elevational views, respectively, of the handle cover plate member of the apparatus of FIGS. 1 and 4;

FIGS. 12–14 are sectional views taken along the lines 12—12, 13—13 and 14—14, respectively, of FIG. 10;

FIG. 15 is a top plan view of the handle divider plate member of FIGS. 1 and 4;

FIG. 16 is an end view of the cable-tensioning pawl spring of FIG. 4;

FIGS. 17 and 18 are detailed views illustrating the cable-tensioning pawl in the released and engaged positions, respectively, relative to its associated cable-tensioning ratchet; and FIG. 19 is a detailed sectional view taken along line 18—18 of FIG. 1.

DETAILED DESCRIPTION

Referring first more particularly to FIGS. 1–4, the cable-operating means 2 of the present invention serves to apply tension to a cable 4 for operating a suitable load 6, such as the parking brake means of a motor vehicle. The cable operating means includes a main ratchet member 8 that is secured to a fixed support, such as the fire wall of the motor vehicle. Pivotally connected with the main ratchet 8 for pivotal movement about fixed pivot axis 10 is handle means 12 including parallel spaced rigidly-connected main handle, divider and cover plate members 14, 16 and 18, respectively. The main ratchet member 8 and the associated main pawl member 20 are contained between the main and divider plates 14 and 16 as shown in FIGS. 4 and 19. The main pawl 20 is normally spring biased into engagement with the teeth of the main ratchet member 8 by the helical spring 24 associated with the conventional parking brake release lever 26 operated by push button 28.

The cable-operating means of the present invention is provided with cable-slack removing means including a cable-tensioning ratchet 30 that is mounted for free rotation about the pivot axis 10, and a cable-tensioning pawl 32 that is connected with the divider plate 16 of the handle means 2 for movement about pivot axis 34. Biasing spring 36 reacts between the pawl 32 and the divider plate member 16 to normally bias pawl 32 into engagement with the teeth of the cable-tensioning ratchet 30. The cable-tensioning ratchet 30 is connected with the cable 4 by a suitable end fitting 38. The cable-tensioning ratchet 30 and the associated pawl 32 are mounted between the divider plate 16 and the cover plate 18. Spiral tensioning spring 40 is mounted concentrically about the main pivot axis 10, and reacts between a lateral tab 18a on the cover plate 18 and a lateral pin 30a on the cable-tensioning ratchet 30 to normally bias ratchet 30 about axis 10 in a direction to remove slack from the cable 4 (i.e., in the clockwise direction in FIG. 1).

Referring now to FIGS. 5 and 6, the main ratchet member 8 includes at its lower end a pair of lateral flange portions 8a and 8b containing openings for bolting the ratchet to a fixed support. In the illustrated embodiment, the main ratchet 8 is sectional and includes a section of hardened metal 8c that contains the ratchet teeth 8d.

Referring to FIG. 7, the spiral tensioning spring 40 includes a reversely bent inner portion 40a adapted to cooperate with the lateral tab 18a of cover plate 18, and a reversely bent outer portion 40b adapted to engage the lateral pin 30a on the cable-tensioning ratchet 30, thereby to normally tension the cable 4 to remove slack therefrom.

Referring to FIGS. 8 and 9, the cable tensioning pawl 32 has a body portion 32a that is provided at one end with a partially punched out slug portion 32b that defines the pivot axis 34 about which the pawl pivots. This laterally projecting slug extends within a corresponding oversize slot 44 contained in divider plate 16, thereby to permit, in accordance with the present invention, lateral movement of the pawl 32 relative to the divider plate 16, as will be described in greater detail below. At its other end, the pawl 32 includes a lateral tab portion 32c that is adapted to engage a corresponding ramp surface 8e when the handle means 2 is pivoted to the cable-tension-released (i.e., brake-released) position, thereby to disengage the pawl from its ratchet. Normally, the cable-tensioning pawl 32 is biased by spring 36 to cause pawl tooth 32d to engage the ratchet teeth 30b. As shown in FIGS. 4 and 16, the pawl biasing spring 36 includes a reversely bent first leg portion 36a that is adapted to straddle an edge portion of and to react against the divider plate 16, and a second leg 36b that is adapted to engage an inclined lobe surface 32e on the pawl 32. In the illustrated embodiment, this lobe surface 32e is inclined at an angle of 27 degrees relative to the longitudinal axis of the pawl 32. The peripheral surface of said pawl one end is rounded to define a semicircular wall surface 32f.

Referring now to FIGS. 10-14, the cover plate 18 includes a planar first body portion 18b from which is punched the laterally outwardly extending tab portion 18a. The cover plate is deformed to define parallel stepped second and third portions 18c and 18d, respectively the second portion 18c being connected with the first body portion 18b by connecting wall 18e, and the third portion 18d being connected with the second portion 18c by the connecting wall portion 18f. The second stepped portion 18c contains an opening 50 one edge portion of which is semi-circular, the corresponding connecting wall portion 18f being similarly of semi-circular configuration as shown most clearly in FIG. 10. As will be described in greater detail below, the semi-circular connecting wall portion 18f, the second wall portion 18c, and the divider plate 16 cooperate to define a pocket which is adapted to slidably receive the corresponding rounded end portion 32f (FIG. 8) at the pivot end of the pawl 32.

As shown in FIG. 15, the divider plate 16 contains the first oblong slot 44 for receiving the portion 32b of the pawl 32, and a second slot 46 for receiving the pin 48 upon which the biasing spring 36 is mounted.

OPERATION

Referring now to FIG. 17, when the handle means 2 is in the cable-tension released (i.e. brake-released) position relative to the stationary main pawl member 8, the lateral tab 32c of the cable tensioning pawl 32 engages the ramp surface 8e on the main ratchet 8, thereby to maintain the pawl 32 in a disengaged condition relative to the its associated ratchet 30. Owing to the restoring force of spiral spring 40, the cable-tensioning ratchet 30 is rotated in a direction to remove slack from the cable 4, as is known in the art. As shown in FIG. 17, the arm 36b of spring 36 engages the angularly arranged lobe surface 32e on pawl 32, thereby to bias pawl 32 longitudinally away from the bottom wall 18f of the pocket defined in the cover member 16.

When the operator now pivots the handle means toward the cable-tensioned (i.e. the brake-engaged) position, the tab 32c is lifted from the ramp 8e on the main ratchet member 8, and the arm 36b of spring 36 pivotally biases pawl 32 in a direction to effect engagement between pawl 32d and the teeth and ratchet member 30b. Three possibilities might now occur.

In a first case, the pawl tooth 32d comes into direct engagement with a ratchet tooth 30b, whereby the cable tension in the cable 4 pivots ratchet 30 to cause the pawl tooth to extend to the bottom of the associated ratchet tooth, the pawl being displaced longitudinally into the bottom of the pocket into engagement with the pocket bottom wall 18f, as shown in FIG. 18. Owing to the frictional cooperation between the semi-circular end surface 32f of the pawl 32 and the corresponding semi-circular bottom wall surface 18f of the pocket, pivotal movement of the pawl 32 away from the ratchet 30 is resisted, thereby to maintain the pawl in the engaged condition relative to the ratchet teeth.

According to a second case, the ratchet 30 is in such a position that the extremity of the pawl tooth 32d engages the outer end portion of the associated ratchet tooth 30b. At this time, the angle of engagement between the tooth surfaces is adequate to ramp the pawl tooth into full engagement with the ratchet tooth 30b before the pawl bearing surface 32f becomes nested in the pocket of the handle means, owing to the floating motion between the partially pierced slug portion 32b of the pawl and the corresponding oversized slot 44 contained in the divider plate.

Finally, in the third case, the pawl tooth 32d makes contact with the extremity of the associated ratchet tooth 30b, whereby the ramp angle is not able to effect engagement between the pawl and the associated ratchet tooth. Consequently, the floating motion between the pawl 32 and the divider plate 16 allows the pawl tooth 32d to ride up and over the ratchet tooth 30b associated therewith and to engage the next available ratchet tooth before the pawl 32 has been displaced to the bottom of the pocket with the pawl end surface 32f in engagement with the pocket wall surface 18f. Consequently damaging of the first tooth encountered is avoided owing to this movement of the pawl 32 toward its fully nested position in the pocket 18f. After the tooth engagement has been established and owing to the relatively large amount of bearing surface area in contact between these surfaces 18f and 32f, the frictional resistance causes it to be more difficult for the pawl to be disengaged from the ratchet 8.

When the operating handle means is again returned toward its brake-released position, pawl tooth 32d becomes released from the cable tension ratchet 30 when the pawl tab 32c again engages the ramp surface 8e of the main ratchet. Owing to the biasing force of spring arm 36b on the pawl lobe surface 32e, the pawl 32 is longitudinally displaced out of its pocket toward the position of FIG. 17.

While in accordance with the provisions of the Patent Statutes the preferred forms and embodiments of the invention have been illustrated and described, it will be apparent to those skilled in the art that various changes and modifications may be made in the apparatus described without deviating from the inventive concepts set forth above.

What is claimed is:

1. Cable tensioning apparatus of the type including cable-slack eliminating means, comprising:
   (a) a main ratchet member adapted for connection with a fixed support, said ratchet member including a plurality of main ratchet teeth;
   (b) handle means pivotally connected with said main ratchet member for movement between cable-tensioned and cable-released positions;
   (c) a main pawl member pivotally connected with said handle means for releasable engagement with said main ratchet teeth;
   (d) a cable-tensioning ratchet connected with said handle means for angular movement about the pivot axis of said handle means, said cable-tensioning ratchet being adapted for connection with the cable, said cable-tensioning ratchet having cable-tensioning teeth;
   (e) main adjusting spring means rotatably biasing said cable-tensioning ratchet in the slack-eliminating direction relative to said handle means;
   (f) means for releasably connecting said cable-tensioning ratchet with said handle means, including:
      (1) a cable-tensioning pawl;
      (2) means connecting said cable-tensioning pawl with said handle means both for pivotal movement about an axis parallel with the axis of rotation of said cable-tensioning ratchet, and for longitudinal axial displacement in a direction normal to said pawl pivot axis between extended and nested positions relative to the said handle means;
      (3) pawl spring means biasing said cable-tensioning pawl pivotally toward engagement with said cable-tensioning ratchet;
   (g) means operable when said handle means is in the cable released position for disengaging said cable tensioning pawl from said cable-tensioning ratchet, thereby to release said cable-tensioning ratchet for rotation by said main spring means to eliminate slack from the cable; and
   (h) means operable when said cable-tensioning pawl is in engagement with said cable-tensioning pawl for resisting pivotal movement of said pawl away from said cable-tensioning ratchet, said pivotal movement resisting means including a pocket defined within said handle means for receiving in frictional engagement one end of said pawl when said pawl is in said nested position.

2. Apparatus as defined in claim 1, wherein said handle means includes parallel spaced main handle, divider and cover plates, said main pawl and said main ratchet being contained between said main handle and divider plates, and said cable-tensioning pawl and said cable-tensioning ratchet being contained between said divider and cover plates, respectively.

3. Apparatus as defined in claim 2, wherein said cable-tensioning pawl includes at said one end a pivot pin that extends laterally within a corresponding slot contained in said divider plate, said slot affording lateral displacement of said pivot pin during displacement of said cable-tensioning pawl between said nested and extended positions.

4. Apparatus as defined in claim 3, wherein said cover plate is deformed to form a recess which cooperates with said divider plate to define said pocket for receiving said one end of said cable-tensioning pawl.

5. Apparatus as defined in claim 4, wherein said pawl one end has a generally circular configuration; and further wherein said pocket includes a semi-circular bottom wall arranged for frictional engagement by the extremity of said one end of said cable-tensioning pawl when said pawl is in said nested position.

6. Apparatus as defined in claim 5, wherein said cover plate contains an opening the edge portion of which is bent to define said pocket bottom wall.

7. Apparatus as defined in claim 3, wherein said cable tensioning pawl pivot pin is defined by an integral cylindrical slug that is partially punched out from said cable-tensioning pawl.

8. Apparatus as defined in claim 7, wherein said cable-tensioning pawl includes an angularly arranged lobe surface against which said cable-tension pawl spring reacts to bias said pawl out of said pocket.

9. Apparatus as defined in claim 8, wherein said cable-tensioning pawl includes at its other end a lateral tab; and further wherein said means for disengaging said cable-tensioning pawl from said cable-tensioning ratchet include a ramp surface on said main ratchet arranged for engagement by said lateral tab when said handle means is in the cable-released position.

* * * * *